June 15, 1948. C. J. HELMERS 2,443,423
APPARATUS FOR CONDUCTING ENDOTHERMIC CATALYTIC CONVERSIONS
Filed April 29, 1946
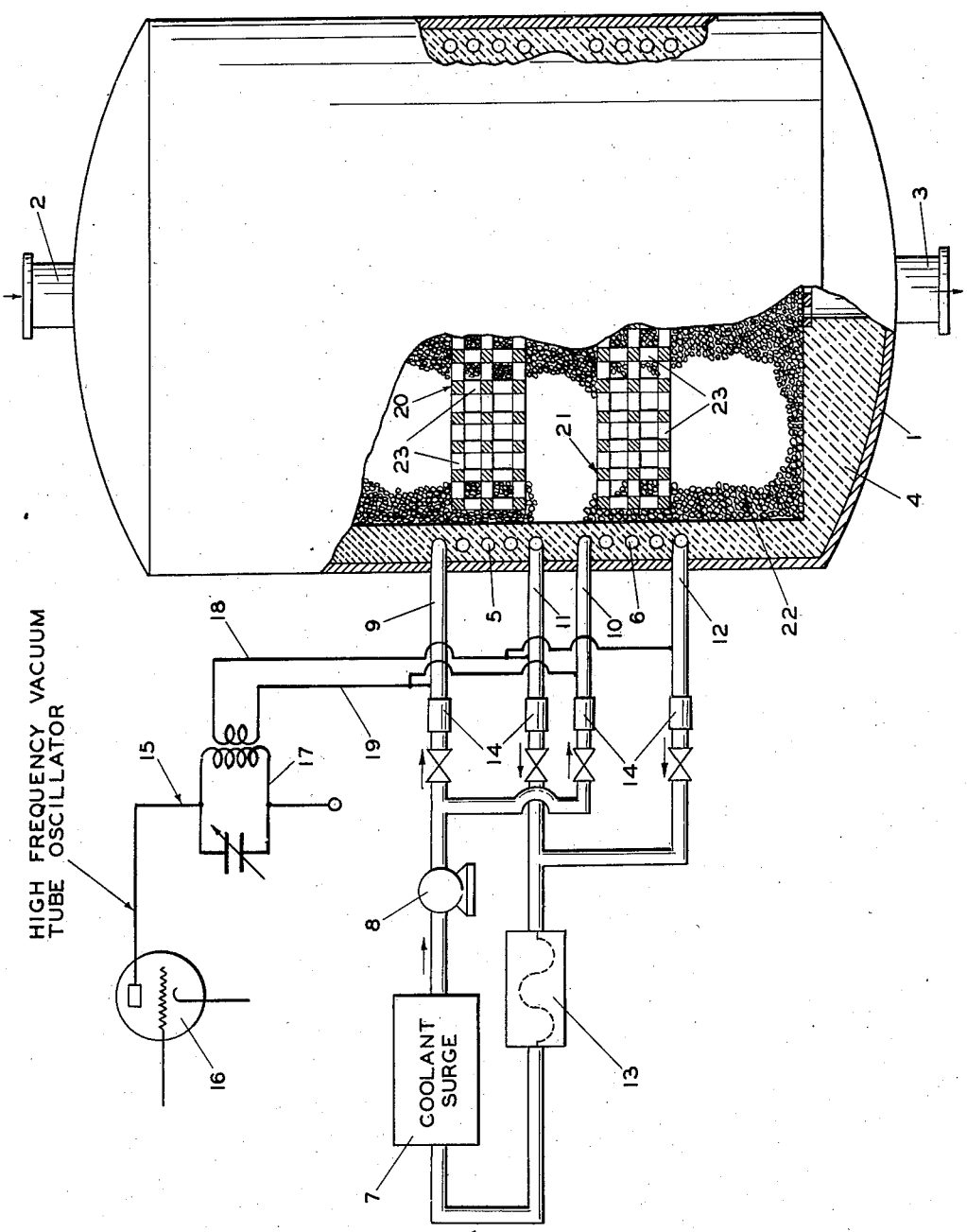
INVENTOR.
C. J. HELMERS
BY
Hudson and Young
ATTORNEYS Patented June 15, 1948

2,443,423

UNITED STATES PATENT OFFICE 2,443,423

APPARATUS FOR CONDUCTING ENDOTHERMIC CATALYTIC CONVERSIONS

Carl J. Helmers, Bartlesville, Okla., assignor to Phillips Petroleum Company, a corporation of Delaware Application April 29, 1946, Serial No. 665,678

3 Claims. (Cl. 196—2)

This invention relates to a method and apparatus for carrying out endothermic catalytic conversions, particularly hydrocarbon conversions. More particularly it relates to a method and means for supplying heat to such a conversion.

In endothermic catalytic conversions, such as reactions involving splitting of the molecule, e. g., dehydrogenation, depolymerization, desulfurization, cracking, etc., certain types of isomerization, etc., it is advantageous to supply heat to the reactants at various points within the catalyst mass in order that the optimum temperature may be maintained throughout the catalyst mass. When additional heat cannot be supplied within the catalyst mass, the reactants must enter the reactor at a temperature considerably above the optimum, and the reactants leave the reactor at some temperature below this optimum. Obviously this is highly disadvantageous and uneconomic since increased losses of raw material through degradation reactions result, and the life of the catalyst is shortened by carbon deposits. Also such superheating of the feed results in over-use and deterioration of the initial increment of the catalyst bed and exposes a high concentration of conversion products to side reactions such as polymerization in traversing the remainder of the bed.

It is well known that heat transfer through beds of catalyst is very poor because the heat conductivity of nearly all catalysts is extremely low. Consequently it is difficult to supply heat to a bed of catalyst by indirect heating coils through which a heated liquid medium is circulated. It has been proposed to circulate a molten salt as the heating medium through heating coils disposed in the bed of catalyst. Such systems are extremely complex and expensive both to install and to maintain. It is not feasible to dispose electrical heating coils throughout the bed of catalyst in an effort to supply the heat absorbed by the reaction. Such heating coils would be subject to breakage with consequent danger of explosion of the hydrocarbon gas being passed through the catalyst bed. Moreover such coils would not stand the high temperatures prevailing which may range from 500° F. upwardly to as high as 1200° F.

Moreover the mechanical problems presented by the passage of heating means through the walls of the converter are extremely serious since it is practically impossible to devise a satisfactory means of sealing the openings which must be made in the wall to receive the heating coils or elements.

The principal object of my invention is to provide an improved method and apparatus for carrying out endothermic catalytic conversions. Another object is to overcome the foregoing objections to prior art attempts to solve the problem. Another object is to overcome such objections in a simple and economical manner. Another object is to impart heat to the reactants undergoing endothermic catalytic conversion in a manner such that no connections are made to the heating element. Another object is to eliminate the necessity of having connections to the heating element made through the lining of the converter. Another object is to eliminate the danger of explosion which would be involved were resistance-wire heating elements placed in the catalyst mass. Another object is to provide apparatus of the foregoing type wherein the heating element is cheap and rugged and does not interfere with the charging and discharging of catalyst. Another object is to provide an improved method and apparatus for carrying out endothermic catalytic conversions which enable the attainment of a substantially constant temperature and therefore substantially constant rate of reaction from the inlet to the outlet of a bed of solid granular contact catalyst disposed in a converter. Many other objects will more fully hereinafter appear.

So far as I am aware, no satisfactory method of imparting heat to a solid bed of catalyst has yet been proposed. Consequently in practice it has been necessary to allow a temperature drop through the converter due to the endothermic nature of the reaction or to heat the feed to a temperature above that required to initiate the reaction or to use inadequate heating means which results in uneven heating and hot spots in the catalyst bed causing lowering of the yield and formation of an objectionable amount of carbon necessitating more frequent regeneration and change of catalyst.

The accompanying drawing portrays a diagrammatic view, with the catalyst chamber partially in vertical section, of one arrangement of equipment which may be employed in accordance with my invention.

In one aspect, the present invention resides in a method of carrying out an endothermic catalytic conversion which comprises passing a stream of the material to be reacted through a bed of solid granular catalyst disposed in a conversion chamber, supplying high frequency electrical current to a primary element outside of the catalyst bed and thereby inducing heating of a secondary element disposed wholly within the catalyst bed and not connected with the primary, and thereby supplying heat to the catalyst and to the reactants and at least partially compensating for the normal tendency of the temperature to drop in the conversion chamber.

In another aspect, the invention resides in apparatus for carrying out an endothermic catalytic conversion comprising means forming a chamber, a bed of solid granular contact catalyst disposed in the chamber, means for admitting a reactant stream to the catalyst bed, metallic means disposed in the catalyst bed and functioning as a secondary induction heating element, a primary induction element outside the catalyst bed, and means for supplying a high frequency electrical current to the primary element and thereby inducing heating of the metallic secondary heating element and thereby the catalyst and the reactant stream.

In the usual practice of my invention, heat is supplied within the catalyst mass by means of a metallic checkerwork imbedded in the catalyst mass. This checkerwork acts as a shorted secondary coil. It may take the form of a grid of integrally connected sections of metal, generally ferrous metal. The corresponding primary is formed by a conductive metal pipe which is preferably imbedded in the reactor lining opposite the checkerwork. This primary coil is preferably wound spirally about the central longitudinal axis of the converter. The primary coil is preferably constructed of pipe or tubing so that a liquid coolant such as water can be circulated internally to cool the coil. It is advantageous to place this primary coil in the chamber liner within the metallic shell of the converter so that a minimum of heat will be induced and dissipated in the shell.

Any desired number of checkerwork sections may be set in the catalyst mass to supply the desired increments of heating. Generally these checkerworks are disposed transversely of the catalyst bed, i. e., in a plane at right angles to the longitudinal axis of the converter, and the primary elements are placed in surrounding relationship in substantially the same plane.

Usually the first checkerwork is placed at a substantial distance from the inlet point and the other checkerworks are placed between this point and the outlet so as to offset the normal tendency of the temperature to drop as the catalyst is traversed.

The invention is applicable to endothermic catalytic conversions generally but is especially applicable to hydrocarbon conversions which are endothermic, such as dehydrogenation and depolymerization. It is particularly advantageous for use in conducting catalytic cracking.

The invention is applicable to those endothermic catalytic conversions which are conducted with fixed beds of solid granular contact catalysts.

The heating of the grid effects heating of both the catalyst near the grid elements and the reaction mixture passing through the grid. The reaction mixture may be heated both by contact with heated catalyst and by direct contact with the heated grid itself.

The reaction mixture is almost invariably in gaseous phase as it is passed through the converter.

In operation in accordance with my invention, the feed reaction mixture is preheated as usual to a temperature sufficient to initiate the conversion and the so heated feed is passed at a substantially constant flow rate into contact with the body of catalyst by introducing the feed at one end of the converter, passing the feed through the body of catalyst and withdrawing the reacted mixture at the other end of the converter. As the reaction mixture passes through the bed of catalyst, it is heated by the grid to offset at least partially the normal tendency for a downward temperature gradient to exist through the catalyst bed in the direction of flow caused by absorption of heat by the endothermic reaction. It may be preferred to supply sufficient heat at such points that the temperature is maintained substantially constant from the initial to the final point of the converter. This results in a substantially constant conversion rate throughout the catalyst body which is highly advantageous.

The grid or grids are entirely unconnected mechanically with the primary element. Thus no openings need be made through the inner face of the refractory lining in order to get heat into the catalyst and reaction mixture. Such connections or openings are undesirable because they introduce complications in assembly and maintenance. My secondaries have no connection with anything outside of the catalyst bed except in the case where they are supported mechanically by the bottom of the converter or from the top thereof. Even in such case no opening through the inner face of the refractory lining need be made since it is possible to merely provide legs which support the grid or grids on the bottom liner.

The frequency applied to the primary may be any frequency which is high relative to the ordinary 60-cycle frequency commonly used on power lines. The frequency will usually range from 1000 cycles per second upwardly. I prefer to use radio frequencies and to generate the current of this frequency in known manner by the well-known vacuum-tube oscillator. By radio frequencies I refer to frequencies ranging from 200 to 3000 megacycles.

I use a primary coil for each secondary. The primary coils surround the secondaries and each is located in substantially the same plane with its secondary in order to give maximum efficiency of energy transfer.

I prefer to circulate a cooling fluid in heat exchange relationship with the primary or primaries in order to remove the heat generated therein. Examples of suitable liquid coolants are water or organic liquids such as "Dowtherm" or oil. If desired the coolant may be a refrigerant in which case means for compressing and liquefying will need to be provided. Any suitable refrigerant may be used, examples being propane, butane, ammonia, sulfur dioxide, etc.

In the accompanying drawing, reference numeral 1 designates a closed cylindrical metal shell, preferably made of mild steel, adapted to withstand the reaction pressure and hold the liner and catalyst in place and having an inlet nozzle 2 at the upper end and an outlet nozzle 3 at the lower end. The lining 4 of the reactor may consist of cast refractory 6 to 12 inches thick. The primary coils of the induction heating system are designated by reference numerals 5 and 6. Coils 5 and 6 are imbedded in liner 4 and consist of several spiral loops of conductive metal pipe or tubing. These coils 5 and 6 are located a substantial distance inside the shell. For example the outside diameter of coils 5 and 6 may be 2 to 6 inches smaller than the inside diameter of reactor shell 1. Coils 5 and 6 are placed in the chamber liner 4 within the metallic shell 1 so that heat will not be induced in and dissipated in the shell to any serious extent. The primary coils are constructed of pipe or tubing so that a coolant can be circulated internally to cool them. The coolant may be any suitable liquid such as water. If desired a non-conducting coolant may be employed to prevent conduction of the high-frequency current supplied to coils 5 and 6 to the equipment for cooling and circulating the coolant. Any other known means of preventing this effect may be employed.

The coolant is passed from a surge or storage tank 7 via pump 8 in parallel through coils 5 and 6. The coolant enters coils 5 and 6 via pipes 9 and 10 respectively and leaves via pipes 11 and 12 respectively, being cooled in cooling unit 13 and recycled. If desired non-conducting sections of pipe, designated as 14, may be inserted in the pipes 9, 10, 11 and 12 to prevent the high-frequency current from being conducted into the cooling system. In addition a non-conducting coolant may be used.

Means 15 of any suitable type is provided for supplying the required high-frequency electrical current to the primary coils 5 and 6. This is shown as a high-frequency vacuum-tube oscillator which is indicated only diagrammatically but is of well-known construction and is commercially available as a complete unit. As shown this unit embodies a vacuum tube 16 such as a "magnetron" and a tank circuit 17 which stores up large amounts of electrical energy available at very high frequency in leads 18 and 19 which are connected to the primary coils 5 and 6. Frequencies ranging from 200 to 3000 megacycles may be employed.

The secondary coil of the induction heating system comprises ferrous checkerworks 20 and 21 which may either float on the catalyst material 22 or be supported independently as from the top or the bottom of the chamber. Chromemolybdenum steel, stainless steel, or other ferrous alloy which has a good structural strength and corrosion resistance at the conditions of operation may be used to form the checkerworks. The checkerwork may be formed in any sort of grid which will allow free flow of catalyst and reactant vapors around and through the checkerwork so that pressure drop is not appreciably increased and so that the catalyst may be withdrawn and replaced readily. The high frequency electrical current supplied to the primary coils 5 and 6 induces in the checkerworks 20 and 21, respectively, molecular motion by which the checkerwork is heated. This liberated heat is then imparted to the catalyst mass and to the reactant vapors.

Any desired number of checkerwork sections (with associated primary coils disposed in the liner 4) may be set in the catalyst mass 22 to supply the desired increments of heating. It is not necessary that all of them be in operation, it being a simple matter to disconnect the high frequency current from any of the primary coils and at the same time discontinue the passage of coolant thereto.

As shown, the primaries are preferably arranged in parallel with respect to both the application of the high frequency electrical current and the circulation of coolant.

The checkerworks may be of such design or have such dimensions that different amounts of heat are generated in different zones of the catalyst bed 22. For example, checkerwork 21 may generate more heat or a higher temperature than checkerwork 20 so as to heat the final portion of the catalyst bed 22 to a greater extent or to a higher temperature than the portion of the bed heated by checkerwork 20, and thereby compensate still further for the normal tendency of the reaction temperature to drop as the reaction mixture traverses the catalyst and overcome the diluent effect of the reaction products which normally tends to cause a slowing up of the reaction.

The drawing portrays one form of grid or checkerwork which may be employed. As shown, the grid 20 and 21 is formed of square metal rods 23. The vertical and the horizontal rods 23 are formed into an integral three-dimensional grid. The grid may be cast in the final form or the preformed rods may be welded together to give a grid of the desired form. While square rods are shown in this figure for simplicity of drawing, it will be obvious that rods of any other desired cross section may be employed. Examples of other cross sections which may be employed are: round, flat with rounded top and bottom, diamond, oval, elliptical, streamline, etc. The square rods may be set on edge so that the diagonals are vertical and horizontal. It is preferred to use rods of such shape and so arranged that flow of reactants through the checkerwork is not interfered with and that catalyst can freely fill the openings.

The checkerwork employed in accordance with my invention may take any suitable form such as the three-dimensional grid shown in the drawings. Any other form in which the construction is such that all parts are integrally connected together to form a great many closed circuits may be employed. In some cases I may use a cast ferrous metal checkerwork similar to the brick checkerworks used in regenerative furnaces except that the unit is integral; however, this may have the disadvantage of not allowing free ingress and egress of catalyst and of becoming plugged with carbon or coke during the on-stream period. The construction of the grid should be such that the catalyst can flow freely into the interstices of the checkerwork during charging of the converter with catalyst and so that fairly uniform heating over practically the entire transverse cross section of the converter takes place with the result that the entire reaction stream is heated in a uniform manner. The checkerwork might be considered to be a three-dimensional network or foraminous structure and when it is heated in the manner described above it produces uniform heating of the catalyst and reaction mixture without hot spots which might injure the catalyst or cause excessive decomposition of the reactants with possible deposition of carbon or coke on the catalyst and with loss of valuable components of the reaction mixture.

I claim:

1. Apparatus for carrying out an endothermic catalytic hydrocarbon conversion comprising a closed metal shell, a refractory lining on the inner face of said shell, a stationary bed of solid granular contact catalyst disposed in the space formed inside of said lining, means for admitting a gaseous stream of the hydrocarbon to be converted to one end of said shell, passing same through said catalyst bed, and withdrawing the resulting reaction mixture from the other end of said shell, means for heating said gaseous stream to at least partially offset the temperature drop due to the absorption of endothermic heat of reaction comprising an open three-dimensional metallic checkerwork disposed transversely of the path of flow of said stream in said chamber and located substantially after the inlet to said chamber, said checkerwork being of metal integrally connected to form a single three-dimensional open network across the chamber, said checkerwork allowing free ingress and egress of solid granular catalyst into and from the interstices thereof during charging and discharging of said chamber with catalyst and allowing free flow of reactant vapors therethrough when on-stream and not appreciably increasing the pressure drop, said chamber and the interstices of said checkerwork being filled with said catalyst when on stream, a primary induction element embedded in said lining, said primary induction element surrounding said checkerwork and being located in the same plane therewith, there being no mechanical connection of any kind through said bed between said checkerwork and said primary element, and means for supplying a high frequency electrical current to said primary element and thereby inducing heating of said checkerwork and thereby effecting heating of said catalyst and of said gaseous stream.

2. Apparatus as defined in claim 1 wherein said checkerwork is a three-dimensional network formed of vertical and horizontal metal rods integrally connected together to form a single unit.

3. Apparatus as defined in claim 1 wherein a plurality of said checkerworks and associated primary elements are provided in spaced parallel relationship along the path of flow in said chamber to substantially completely offset the normal tendency for a downward temperature gradient to exist from the inlet to the outlet of said chamber.

CARL J. HELMERS.

REFERENCES CITED

The following references are of record in the file of this patent:

UNITED STATES PATENTS

| Number | Name | Date |
| --- | --- | --- |
| 1,688,679 | Baum | Oct. 23, 1928 |
| 2,406,640 | Siecke | Aug. 27, 1946 |